Figure 3:
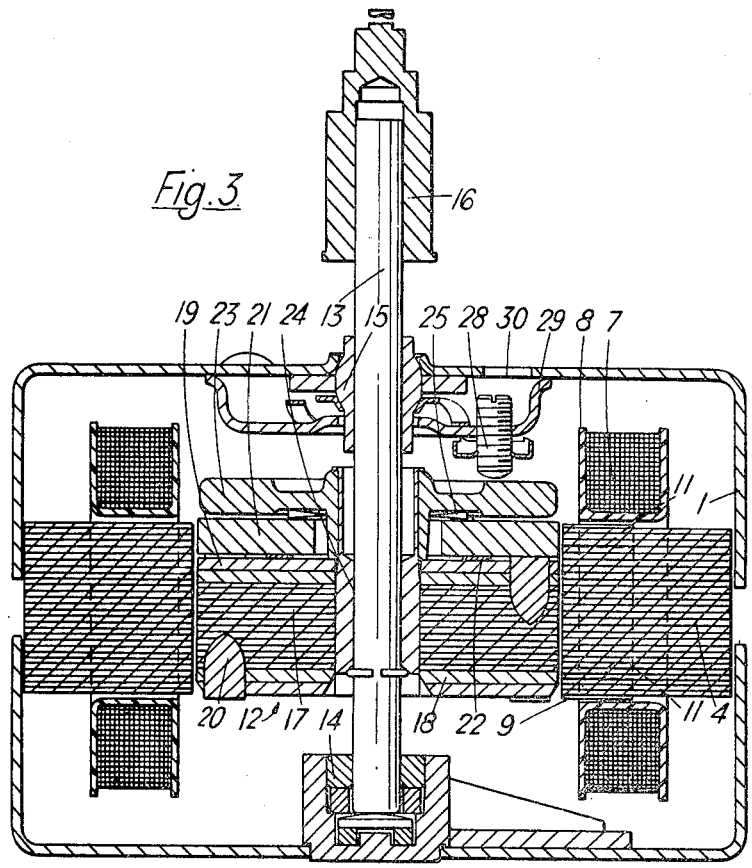

Sept. 28, 1965  A. E. DRAPER  3,209,185
SOUND REPRODUCING APPARATUS
Filed Dec. 10, 1962  2 Sheets-Sheet 1

Inventor
A. E. Draper
By
Attorneys

Sept. 28, 1965    A. E. DRAPER    3,209,185
SOUND REPRODUCING APPARATUS
Filed Dec. 10, 1962    2 Sheets-Sheet 2
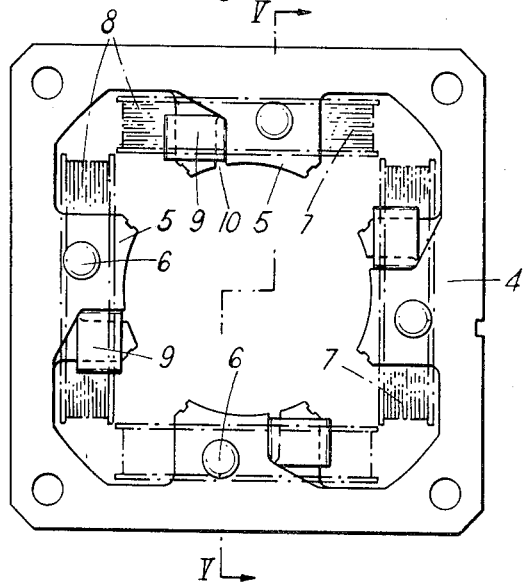
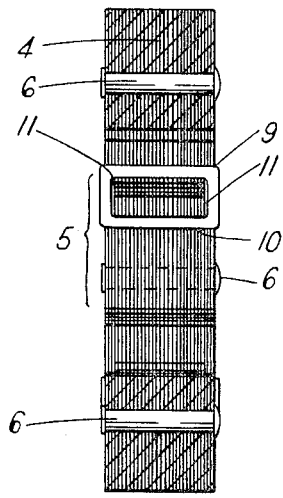
Inventor
A. E. Draper
By
Attorneys

United States Patent Office 3,209,185
Patented Sept. 28, 1965

3,209,185
SOUND REPRODUCING APPARATUS
Albert Eric Draper, Hornchurch, England, assignor to The Magnavox Electronics Company Limited, Barking, England, a British company
Filed Dec. 10, 1962, Ser. No. 243,223
Claims priority, application Great Britain, Jan. 31, 1962, 3,680/62
1 Claim. (Cl. 310—126)

Modern sound reproducing apparatus such as gramophones and tape recorders include turntables and tape spools which are rotated by electric motors at one or other of a number of distinct predetermined speeds. It is important for accurate sound reproduction that the motors should drive the turntables and tape spools within very small tolerances of the predetermined speeds. The motors usually run on the normal single phase, alternating current domestic supply.

Synchronous motors which can be relied upon to produce a constant output speed that is only dependent on the frequency of the exciting voltage have not previously been practicable. This is because they require large capacitances and special start-run coils to produce the necessary field characteristics to provide sufficient torque to pull the motor speed back into synchronism, with the motor under load, after the motor speed has fallen some way below synchronous speed upon change of the speed of the turntable or tape spool from one predetermined speed to another.

It has therefore been usual to use squirrel cage induction motors but this type of motor cannot be mass produced to run at a given speed. To overcome this it has been necessary to test the speed of every motor after it has been assembled in a gramophone or tape recorder and to fit pulleys of differing sizes in the drives from the motors to the turntables or tape spools so that the turntables or tape spools are driven at the required predetermined speeds. This operation has, of course, introduced undesirable delay in the production line.

According to the present invention, a single phase, alternating current, electric motor for driving a gramophone or tape recorder comprises a rotor which is rotatable within a stator each pole piece of which has a shade ring that extends part of the way along the pole piece in the axial direction of the rotor, the part of the rotor which rotates within the part of the stator including the shade ring having a squirrel cage winding and the part of the rotor which rotates within the other part of the stator being formed with a number of circumferentially spaced permanent magnetic poles, whereby, in use, the motor on starting acts as a squirrel cage induction motor and subsequently acts as a synchronous motor when the rotor has been accelerated nearly to its synchronous speed.

With this arrangement, a compact, inexpensive and simple motor is produced which has the major advantages of both a synchronous motor and an induction motor but with a single set of stator windings and pole pieces. The induction part of the motor provides the necessary torque to accelerate the motor under load on starting and when the speed of the motor has fallen below synchronous speed upon operation of the change speed mechanism of the gramophone or tape recorder.

The synchronous part of the motor ensures that the motor will normally run at an absolute speed which is tied only to the frequency of the exciting voltage and no adjustment from one motor to another is necessary.

The shade ring may extend along the pole piece from one end but this arrangement does not fully utilise all the space within the coil which is wound around the pole piece and excessive heating results. Preferably, therefore, the shade ring shades the central portion of the pole piece in the axial direction of the rotor, and the part of the rotor which is formed with the magnetic poles rotates within one unshaded end portion of the pole piece. This arrangement is more efficient since the shade ring which is usually rectangular has two arms extending parallel to the axial direction of the rotor and two transverse arms which connect the ends of the first pair of arms and which lie in cut away end portions of the pole piece. The coil can then be wound closely around the pole piece and all the space within the coil is fully utilised.

The part of the rotor which is formed with the magnetic poles is preferably a ceramic disc magnet which is fixed to the end ring at one end of the squirrel cage part of the rotor and which may have four poles. In this case there will be four symmetrically arranged stator pole pieces and coils.

The ceramic magnet cannot easily be drilled with holes to balance the rotor because the ceramic material is brittle. When the ceramic magnet is used, therefore, a balancing ring which is arranged to be drilled as necessary to balance the rotor, is preferably fixed to the rotor on the side of the magnet remote from the squirrel cage part of the rotor.

Figure 1:
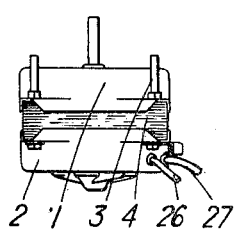
Figure 2:
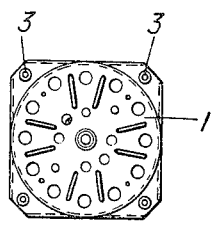

One example of a motor for driving a three speed gramophone and constructed in accordance with the present invention is illustrated in the accompanying drawings in which:

FIGURE 1 is a side elevation;
FIGURE 2 is a plan;
FIGURE 3 is a central vertical section through the motor;
FIGURE 4 is a diagrammatic plan of the stator; and,
FIGURE 5 is a section on the line V—V in FIGURE 4.

The motor has an outer casing formed in two halves 1 and 2 secured together by bolts 3 which extend through a stack of stator laminations 4.

The stator laminations 4 which are shown most clearly in FIGURES 4 and 5 are formed with four symmetrically arranged inwardly projecting pole pieces 5. The inner faces of these pole pieces 5 define a cylindrical tunnel for the rotor. The stack of stator laminations 4 are secured together by rivets 6 which extend one through each of the pole pieces 5. Each pole piece 5 is surrounded by a stator coil 7 which is wound on a plastic support 8. Each pole piece is shaded by a copper shade ring 9 which is located in an axially extending slot 10 and two cut away end portions 11 in the pole piece. Each shade ring shades approximately the central three quarters of the length of the pole piece in the axial direction of the rotor and stator. The two transverse end arms of the rectangular shade ring which connects the longer arms lying in the axial direction, lie one in each of the cut away portions 11 in the pole piece. Very little of the shade ring therefore projects beyond the end of the pole piece and no cut away portions of the pole piece remain empty so that the space within the coil 7, which closely surrounds the pole piece, is fully utilised and heating effects are kept to a minimum.

A rotor 12 is carried on a main driving shaft 13 which is supported at one end in a bearing 14 carried by the casing half 2 and extends through the other casing half 1 where it is supported by a spring loaded bearing 15. At its free end the driving shaft 13 carries a radially stepped spindle 16 which transmits drive to the turntable of a gramophone. The transmission to the turntable includes a rubber wheel (not shown) which bears against one of the steps on the spindle 16 depending at which of three speeds the turntable is to be rotated.

The rotor has at one end a laminated part 17 between two copper end rings 18 and 19 and this part is built up with squirrel cage windings 20. An annular disc magnet 21, made of a material composed of sintered iron oxide and barium carbonate, is stuck with an epoxy resin adhesive 22 coaxially to the end ring 19 of the squirrel cage part of the rotor. The magnet is magnetised with four symmetrically spaced permanent magnetic poles around the edge of one face. The central hole in the annular disc magnet 21 through which the driving shaft 13 passes, is larger than the outer diameter of the shaft. A balancing ring 23 surrounds the shaft 13 to the side of the disc magnet remote from the squirrel cage part of the rotor and has a tubular spigot 24 which extends through the annular space between the magnet 21 and the shaft 13 and is a force fit within the hollow core of the squirrel cage laminations. A small spring 25 which also surrounds the shaft 13 is compressed between the disc magnet 21 and the balancing ring 23. Any balancing which is necessary once the magnet has been assembled with the rotor is provided by drilling the balancing ring.

It will be seen that the squirrel cage part of the rotor rotates for the most part within the shaded portions of the pole pieces whilst the ceramic magnet 21 rotates for the most part in the upper unshaded end portions of the pole pieces. When electric current is supplied through wires 26 and 27 to the stator coils 7, the squirrel cage part of the rotor together with the shaded portions of the pole pieces act as an induction motor and provide a good torque upon starting and when the motor falls below a synchronous speed. The disc magnet together with the unshaded portions of the pole pieces act as a synchronous motor and ensure that the rotor and driving shaft snaps into a synchronous speed of rotation when the induction part of the motor has raised the speed of rotation almost to this synchronous speed.

Since the stator and disc magnet have four separate poles the rotor will rotate, when synchronised with the exciting voltage, at a frequency of half that of the exciting voltage; for example 1500 r.p.m. when the exciting voltage has a frequency of 50 c.p.s.

A small set screw 28 which is screwed through a housing 29 for the bearing 15 and which is accessible through a hole 30 in the casing half 1 is arranged to limit the axial floating movement of the rotor in the tunnel, formed by the pole pieces, during transit.

I claim:

A single phase, alternating current, electric motor for driving a phonograph or tape recorder, said motor comprising a continuous stack of stator laminations defining a plurality of pole pieces and a tunnel therethrough, coil means encircling each pole piece, a rotor rotatable within said tunnel, a shade ring extending part of the way along each of said pole pieces in the axial direction of said tunnel, the axial ends of each pole piece being recessed to accommodate said shade ring so that said pole piece and shade ring substantially fill the space within the coil means on said pole piece, a first part of said rotor rotating between those parts of said pole pieces along which said shade rings extend, a squirrel cage winding on said first part of said rotor, a second part of said rotor rotating between those parts of said pole pieces along which said shade means does not extend, said second part comprising a ceramic disc magnet having a plurality of permanent magnetic poles circumferentially spaced thereabout, whereby said motor, on starting, acts as a squirrel cage induction motor and subsequently acts as a synchronous motor when said rotor has been accelerated nearly to its synchronous speed.

References Cited by the Examiner

UNITED STATES PATENTS

| | | | |
|---|---|---|---|
| 2,477,424 | 7/49 | Schweitzer | 310—112 |
| 2,541,422 | 2/51 | Kirkland et al. | 310—156 |
| 2,836,743 | 5/58 | Braun | 310—156 |
| 2,949,553 | 8/60 | Benoit | 310—162 |
| 3,059,131 | 10/62 | Everard et al. | 310—156 |

OTHER REFERENCES

"Power Engineering," vol. 60, No. 9, page 93, September 1956.

ORIS L. RADER, *Primary Examiner.*

MILTON O. HIRSHFIELD, *Examiner.*